United States Patent [19]
Briar et al.

[11] 4,063,915
[45] Dec. 20, 1977

[54] MARBLE MELT GLASS FIBER FEED SYSTEM

[75] Inventors: Thomas J. Briar, Trafford; Thomas C. Bour, Glenshaw, both of Pa.

[73] Assignee: PPG Industries, Inc., Pittsburgh, Pa.

[21] Appl. No.: 735,463

[22] Filed: Oct. 26, 1976

Related U.S. Application Data

[63] Continuation-in-part of Ser. No. 638,247, Dec. 8, 1975, abandoned.

[51] Int. Cl.² .............................................. C03B 37/02
[52] U.S. Cl. ...................... 65/11 R; 65/11 W; 65/335; 214/18 GD; 214/35 R
[58] Field of Search ............ 214/18 GD, 35 R; 65/2, 65/11 R, 11 W, 335

[56] References Cited

U.S. PATENT DOCUMENTS

| | | | |
|---|---|---|---|
| 2,151,514 | 3/1939 | Heinen | 214/35 R |
| 2,453,864 | 11/1948 | Schlehr | 65/2 |
| 2,687,599 | 8/1954 | Fletcher | 65/11 W X |
| 2,875,893 | 3/1959 | Russell | 209/11 |
| 3,013,096 | 12/1961 | Glaser | 13/6 |
| 3,013,361 | 12/1961 | McFadden | 65/7 |
| 3,049,754 | 8/1962 | Frickert | 65/3 |
| 3,056,846 | 10/1962 | Glaser | 65/2 X |
| 3,104,761 | 9/1963 | Roherson | 209/87 |
| 3,701,642 | 10/1972 | Stream | 65/11 W |
| 3,730,695 | 5/1973 | Varrasso | 65/11 R X |
| 3,779,730 | 12/1973 | Ramge | 65/335 X |
| 3,945,814 | 3/1976 | Keib et al. | 65/335 X |

FOREIGN PATENT DOCUMENTS

| | | | |
|---|---|---|---|
| 486,447 | 11/1929 | Germany | 65/335 |

*Primary Examiner*—Robert L. Lindsay, Jr.
*Attorney, Agent, or Firm*—Alan T. McDonald; John E. Curley

[57] ABSTRACT

A marble feed system is disclosed for feeding glass marbles into a marble melt glass fiber forming bushing. The system comprises a storage container or hopper, a marble pre-melter, a glass fiber forming bushing, and a chute connecting the container or hopper to the pre-melter. The chute is specifically designed to prevent blockages of glass marbles due to bridging, oversized marbles and broken marbles during feeding. The novel design enables pure gravity flow of glass marbles without the need for external vibration of the feed system or other means of force feeding the marbles through the system.

10 Claims, 5 Drawing Figures

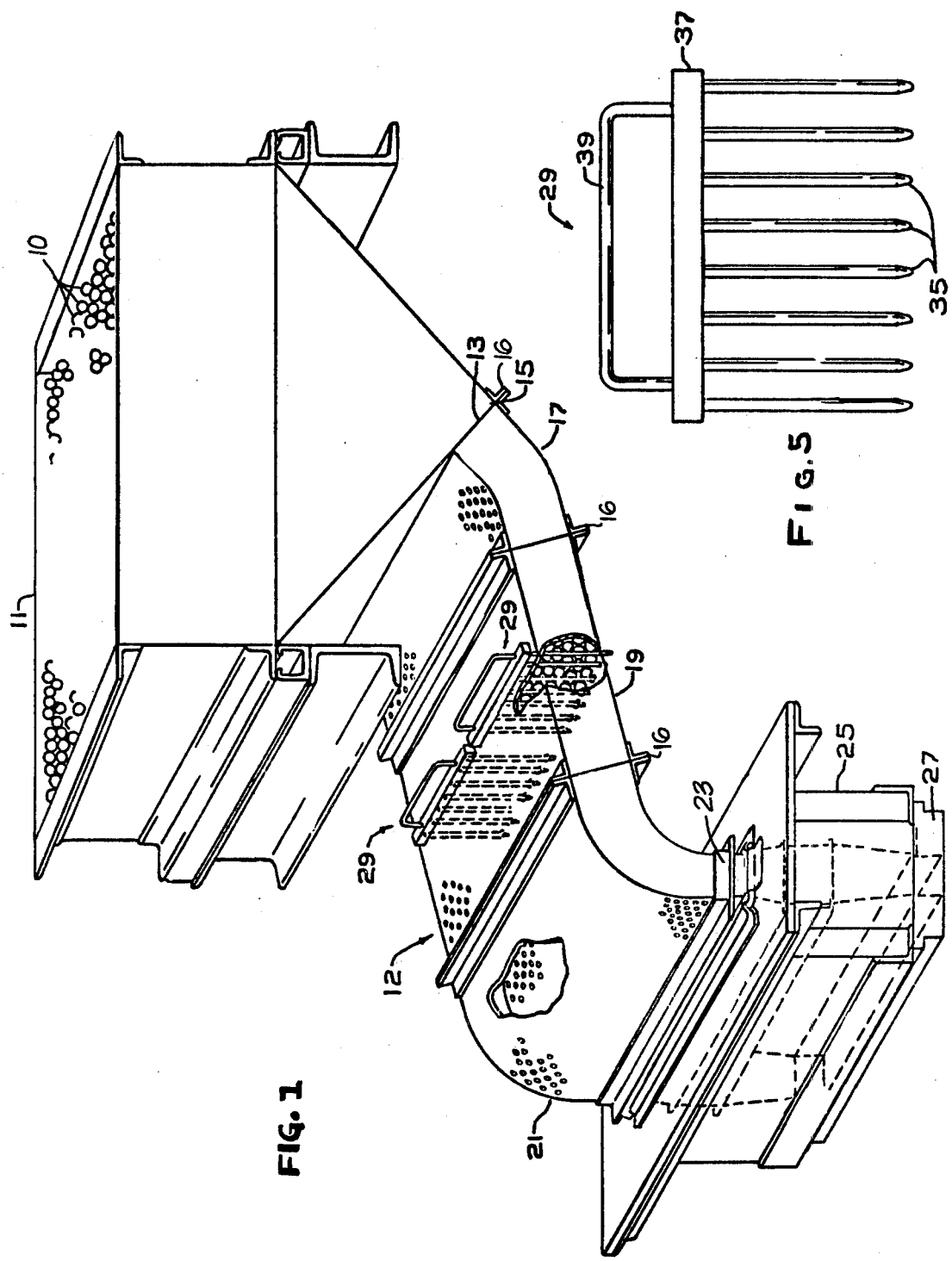

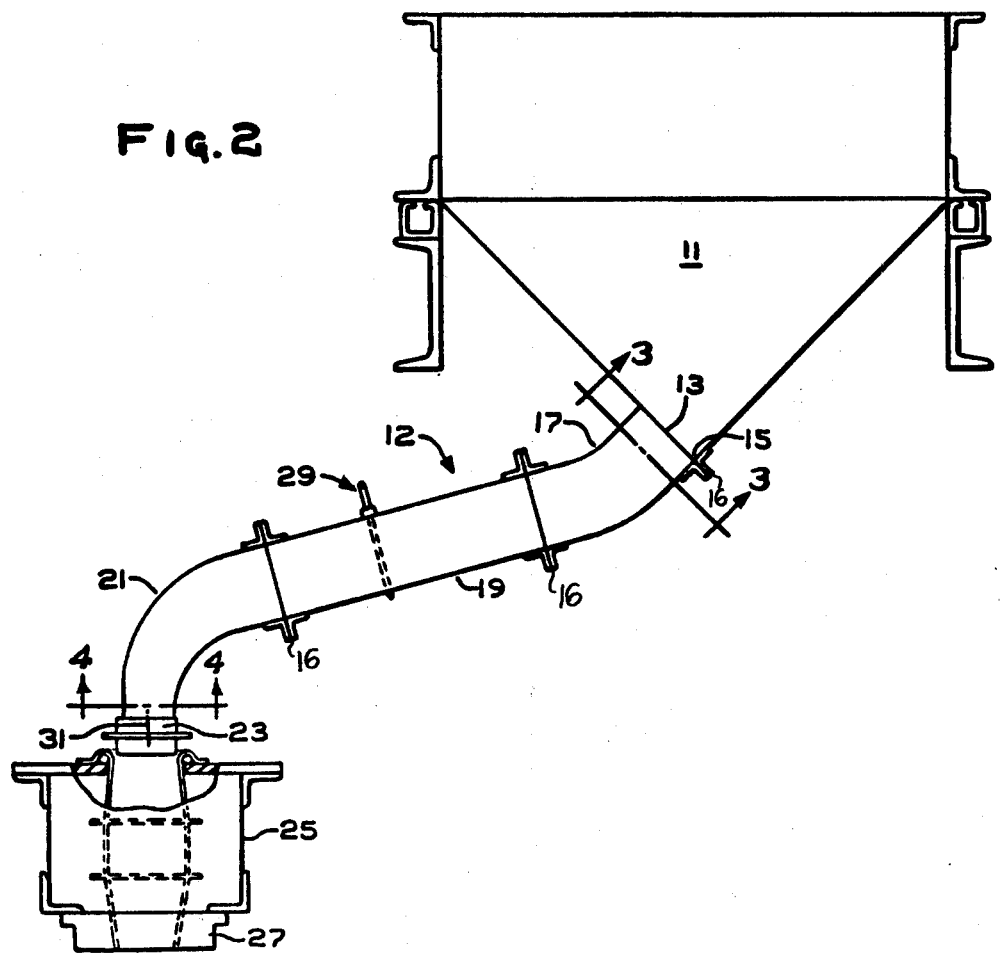
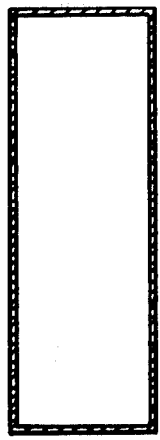

MARBLE MELT GLASS FIBER FEED SYSTEM

CROSS-REFERENCE TO RELATED APPLICATIONS

This application is a continuation-in-part of Application Ser. No. 638,247, filed Dec. 8, 1975, now abandoned for MARBLE MELT FEED SYSTEM.

BACKGROUND OF THE INVENTION

Glass fibers are conventionally formed by the attenuation of molten glass through orifices in a bushing by mechanical means. One of the ways of forming the molten glass above the bushing orifices is to supply marbles of glass having the desired composition to a pre-melter above the bushing orifices. The marbles are heated to a temperature above their melting point and the molten glass is held in the bushing until it is attenuated into fibers. Typical systems for feeding glass marbles directly to the pre-melter are those illustrated in U.S. Pat. Nos. 2,453,864; 2,687,599; 3,875,893; 3,013,096; 3,103,361; 3,049,754; 3,056,846; 3,104,761 and 3,701,642. With the exception of U.S. Pat. No. 2,687,599 and U.S. Pat. No. 3,779,730 which will be more fully discussed below, all of these patents must either vibrate the feed system or force-feed or drop marbles into the system in order to maintain a constant supply of marbles to the pre-melter.

In U.S. Pat. No. 2,687,599 gravity flow of glass marbles from a marble supply to a pre-melter is utilized. The marbles run along a plurality of tubular cylindrical tracks which are slightly in excess of the diameter of the marbles to a mechanism for dropping marbles one by one into the pre-melter.

In U.S. Pat. No. 3,779,730 a single line of marbles flow by gravity from a hopper to a pre-melter. Recognizing the tendency for such a system to become clogged, this patent includes an alarm system for determining clogs and warning the operator of these occurrences.

While the prior art systems may be utilized to feed marbles to a marble melt bushing, these systems do encounter problems. Thus, when an oversized marble gets into these conveyor systems, blockage of the system often results. When any such system is blocked, it becomes necessary to manually remove the oversized blocking marble from the system. Often this removal involves stopping production while the impediment is being removed.

A second problem common to the prior art systems is the fact that glass marbles have a tendency to chip and break. As these chips enter the feed systems of the prior art along with full sized marbles, the flow of marbles may be stopped with the resulting necessity of manually clearing the blockage.

A third problem which occurs, even when only correctly sized glass marbles are employed, is a tendency for the marbles to bridge among themselves in the conveying system. In simpler terms, glass marbles have a tendency to plug up a passage rather than to flow through the passage evenly. This again results in an interruption in flow of the marble in the feed system with the same necessity for manual clearance.

In another system, marbles are gravity fed vertically from hoppers to the pre-melter and bushing. However, realizing that the weight of the marbles on the bushing has an adverse effect on fiber production, the marbles are, in at least one embodiment, fed to a "pre-pre-melter," which melts the marbles and allows only molten glass to the pre-melter and bushing. Such a system involves extra heating means, precious metal, and, of course, added costs. Typical of such systems are U.S. Pat. No. 3,056,846 and U.S. Pat. No. 3,730,695.

As can be readily seen, the prior art marble feed systems require an almost constant need for supervision to prevent interruptions and to clear blockages that do occur in the marble feed system or require intricately controlled feeds involving complicated apparatus.

The present invention eliminates the necessity for a constant watch over the marble melt feeding of a bushing and allows for the continuous feed of broken and oversized marbles along with the properly sized marbles to a pre-melter. The system is easy to construct and has no moving parts. Other advantages of the present invention will become apparent to those of ordinary skill in the art.

BRIEF DESCRIPTION OF THE DRAWINGS

FIG. 1 is a perspective view, partly in section, of the marble feed system of the present invention.

FIG. 2 is a diagrammatic representation of the marble feed system of the present invention.

FIG. 3 is a sectional view through line 3—3 of FIG. 2 illustrating the shape of the chute employed in the system of the present invention at its connection to the marble container.

FIG. 4 is a sectional view through line 4—4 of FIG. 2 illustrative the shape of the chute at its entrance to the marble pre-melter.

FIG. 5 illustrates a typical stop employed to interrupt the flow of marbles through the system when desired.

DETAILED DESCRIPTION OF THE PREFERRED EMBODIMENT

As shown in FIG. 1, the chute 12 of the present invention is connected to a supply of marbles such as a container or hopper 11 containing glass marbles 10 and associated with a pre-melter 25 for a glass fiber forming bushing 27.

The chute 12 is shown in its preferred embodiment wherein the top and bottom are formed of metal mesh to dissipate heat rising from the bushing 27 and pre-melter 25 to avoid premature softening of the glass marbles 10 within the chute 12 which might cause blockages. Of course, the entire chute 12 could be formed of metal mesh, if desired. As can be seen from this figure, the connections between the chute 12, the container or hopper 11 and pre-melter 25 are elongated and slot-like in shape.

As illustrated in FIG. 2, the glass marble feed system of the present invention comprises a source of glass marbles such as a container or hopper 11 which contains a supply of glass marbles of a desired glass composition which is to be melted and formed into glass fibers. The container 11 has an elongate slot-like opening 13 at or near its bottom which is directly connected to a chute, generally illustrated at 12. The height of opening 13 and the height of chute 12 at its connection to the opening at 13 must be of such a size that their dimensions are not less than three times the diameter of a properly sized marble for use in the system at their connection between the two. As can be seen in FIG. 3, the chute 12 employed typically has a rectangular cross-section with the height of the rectangular at its connection 13 to the hopper 11 being at least three times the diameter of the marbles employed.

The chute 12 is designed for gravity flow of the marbles from the hopper 11 to a pre-melter 25. The angle of inclination of the main body 19 of the chute 12 above the horizontal is thus critical. The angle must be sufficient to allow gravity flow of the marbles 10 from the container 11 to the pre-melter 25 but slight enough to prohibit disruption of the bushing due to the weight of the marbles 10 in the chute 12. It has been found that if the angle of inclination of the main body 19 of the chute 12 is less than about 10° from the horizontal, pure gravity flow is not obtained. Conversely, if the angle of inclination exceeds about 30°, the weight of the marbles upon the molten glass in the bushing 27 and pre-melter 25 adversely affects the operation of the bushing 27. Between about 10° and 30° successful operation of the marble feed system results. Especially good results have been obtained at an angle of inclination of 15° from the horizontal.

To accomplish this result, the chute 12 is designed having a main body 19 which is maintained between the critical angles. The main body 19 may be directly connected to the container or hopper 11 at one end or a connecting member 17 may be provided. The connection member 17 is especially desirable when angles of the walls of the container or hopper 11 are such that their angle from the horizontal exceeds the critical angle for the main body 19. The connection member 17 can thus be angled from between 10° to 90° from the horizontal at its connection to the container or hopper 11 without affecting the operation of the chute 12. The connection member 17 is then shaped to provide an angle within the critical angles at its connection to the main body 19.

A second connecting member 21 is provided to associate the main body 19 of the chute 12 with the pre-melter 25. The connecting member 21 is shaped, similarly to the connecting member 17, to connect to the main body 19 of the chute at its critical angle and to the pre-melter 25, which is fed vertically.

The container or hopper 11, the connection member 17, the main body 19 and the connection member 21 are attached to each other by means such as flanges 16. The connection member 21 is not directly attached to the pre-melter 25, but is mounted within an opening at the top of the pre-melter 25.

The majority of the weight of the marbles is absorbed by the main body 19 of the chute 12. This allows vertical feeding of the pre-melter 25 by pure gravity flow without adversely affecting production of the bushing 27.

The length of the chute 12 is not critical, but the design affords an opportunity for a compact system. For example, the horizontal distance between the center point 15 of the container or hopper 11 and the center point 31 of the pre-melter 25 can be, for example, as little as 24 inches (60.96 centimeters).

The entrance of the pre-melter 25 is also elongate and slot-like in shape. Its width, and the height of the chute 12 at its entrance to the pre-melter 25 is not less than 2 times the dimension of the glass marbles 10 to be melted. FIG. 4 illustrates the elongate slot-like shape of the chute 12 at this point 23 and its difference in height than at the opening to the container or hopper 11 as shown in FIG. 3.

The reduction in height of the chute 12 from three times the dimension of the marbles at its connection with the marble source 11 to two times the dimension of the glass marbles at its entrance to the pre-melter 25 can be accomplished by several means. Preferably, there is a gradual taper in height near the opening to the pre-melter in the connecting member 21. Optionally, this taper could be along the complete length of the chute 12. Alternatively, there could be one or more step reductions in the height of the chute 12 along its length.

The elongate slot-like shape of the entrance to the pre-melter 25 serves another function. As relatively cold marbles 10 enter the pre-melter 25, a cold spot develops at that point. With the prior art cylindrical feed tubes, marbles 10 enter only at the mouths of the cylinders, thus forming one or more isolated cold spots. With the present system, marble feed is continuous across the length of the pre-melter 25, thus leading to a more even temperature distribution across the pre-melter 25.

In the preferred embodiment of the present invention, the chute 12 is formed of metal mesh. The use of such material lowers the weight of the chute 12 considerably. Even more important, the metal mesh allows heat from the pre-melter 25 to rise out of the chute 12. This prevents the temperature within the chute 12 from reaching a point where the marbles within the chute 12 might soften, stick to the chute surface and possibly block the system.

While the system of the present invention is designed for continuous operation, it is sometimes necessary to shut down the operation for maintenance and the like. To cut off the marble feed to the pre-melter 25 without the necessity of emptying the container or hopper 11, a marble stop 29 is provided at any desired point along the chute 12. As can be seen in FIG. 4, the stop 29 is constructed of prongs or fingers 35 connected by a bar 37 to a handle 39. The prongs 35 are spaced such that the glass marbles cannnot fit between the prongs. The prongs 35 are manually fed through the metal mesh to close off the chute 12 from further marble feed. The bar 37 rests on the metal and holds the prongs 35 in place. When operation of the system is to resume, the operator need only pull the stop 29 out of the chute 12 with handle 39. This stop can be formed of a single piece or can be formed of a number of smaller units that can be located adjacent each other.

As has been previously stated, the dimensions of the chute 12 are critical to proper marble feed. Typically, glass marbles have diameters of approximately 0.748 to 0.9843 inch (19 to 25 millimeters). In order to accomodate the larger marbles, and maintain a width of at least three times the diameters of the marbles, the chute 12 should be at least about 3.0 inches (7.62 centimeters) in height at its point of connection 13 to the container or hopper 11. To maintain the width of the opening 23 to the pre-melter 25 at two times the diameter of the marbles at its entrance to the pre-melter 25, the chute 12 should be at least about 2.0 inches (5.08 centimeters) in height. These dimensions can, of course be varied according to the size of the glass marbles employed, as long as the required relationships are maintained.

EXAMPLE

A K37 bushing 27 was connected to a glass marble pre-melter 25. This bushing produces glass fiber strand having 400 filaments. The pre-melter 25 had an opening at its top of 2½ inches by 13 inches (6.35 by 33.02 centimeters). Fitted inside of the pre-melter 25 was one rectangular end 23 of a marble chute 12 according to the present invention having a length of 12 inches (30.48 centimeters) and a height of 2 inches (5.08 centimeters)

at its end 23. The difference in length and width between the two lengths were compensated for with metal strips to seal the unit. This chute 12 was then widened to dimensions of 3 inches (7.62 centimeters) by 12 inches (30.48 centimeters). The chute was located at an angle of 15 degrees above the horizontal along its straight main body section 19 and was connected at its opposing end 13 to the bottom of a hopper 11 containing glass marbles 10. The opening at the bottom of the hopper 11 was also a rectangle having dimensions of 3 inches by 12 inches (7.62 by 30.48 centimeters). The glass marbles 10 employed had an average diameter of approximately 0.748 inches (19 millimeters).

Glass marbles 10 were then allowed to flow through the system. The pre-melter 25 was operated at a temperature of 2,390° F. (1,310° C.) and the bushing 27 at a temperature of 2,107° F. (1,152.8° C). Glass fibers were pulled from the bushing at a rate of 42.9 pounds per hour of glass. This operation was continued for 336 hours without any interruption in marble flow occurring.

The system operated freely with no stoppage resulting from either oversized marbles, broken marbles, or bridging of marbles.

As can be seen from the above example, the marble feed system of the present invention allows continuous operation of a marble melt glass fiber bushing without the necessity for constant supervision and stoppage resulting from blockages of the glass marble feed system.

While the foregoing description of the invention has been made with reference to specific embodiments, it is not intended that the invention be limited except insofar as in the appended claims.

We claim:

1. Apparatus for feeding glass marbles directly to a fiber forming bushing comprising a container having an elongate slot-like opening at or near the bottom therein, the height of said opening being not less than three times the diameter of glass marbles contained in said container, a pre-melter connected to said bushing and having an elongate slot-like opening therein for receiving glass marbles, said opening having a width not less than two times the diameter of said glass marbles, and a chute connecting said container to said pre-melter, said chute having a main body and having an opening at either end corresponding to the dimensions of the openings of said pre-melter and said container, said chute having its side to side dimension sufficient to accommodate flow of a plurality of marbles in side-by-side relation to provide feed of marbles across the width of the pre-melter, the main body of said chute being positioned with respect to said container and said pre-melter to provide an angle from the horizontal sufficient to allow for gravity feed of said glass marbles from said container to said pre-melter but slight enough to prohibit disruption of said pre-melter or said bushing from the weight of the marbles contained in the chute.

2. The apparatus of claim 1 wherein the height of said chute tapers from its opening connected to the container to its opening at its entrance to the pre-melter.

3. The apparatus of claim 1 wherein the height of said chute changes from its opening connected to the container to its opening at its entrnace to the pre-melter in one or more steps.

4. The apparatus of claim 1 wherein the angle of the main body of said chute from the horizontal is from about 10° to about 30°.

5. The apparatus of claim 4 wherein said angle is 15°.

6. The apparatus of claim 1 wherein said chute is at least partially formed of metal mesh.

7. The apparatus of claim 6 including one or more marble stops to impede the flow of marbles from said container to said pre-melter.

8. The apparatus of claim 7 wherein said stops comprise a series of prongs connected to a bar, said bar being connected to a handle.

9. The apparatus of claim 1 wherein the height of the chute at the opening in said pre-melter is about 3.0 inches (7.62 centimeters).

10. The apparatus of claim 9 wherein the height of the chute at the opening in said pre-melter is about 2.0 inches (5.08 centimeters).

* * * * *

UNITED STATES PATENT AND TRADEMARK OFFICE
CERTIFICATE OF CORRECTION

PATENT NO. : 4,063,915

DATED : December 20, 1977

INVENTOR(S) : Thomas J. Briar and Thomas C. Bour

It is certified that error appears in the above-identified patent and that said Letters Patent are hereby corrected as shown below:

Column 1, line 22, "3,103,361" should be --3,013,361--.

Column 2, line 30, "illustrative" should be --illustrating--.

Column 4, line 38, "metal and" should be --metal mesh and--.

Column 6, line 37, "in said pre-melter" should be --in said container--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks